United States Patent
True et al.

(10) Patent No.: US 12,033,203 B2
(45) Date of Patent: Jul. 9, 2024

(54) PRODUCT SELECTION PACKAGING AND METHOD OF USE THEREOF

(71) Applicant: Johnson & Johnson Consumer Inc., Skillman, NJ (US)

(72) Inventors: Todd True, Princeton Junction, NJ (US); Karin Taylor, New York, NY (US); Jeff Silva, Brooklyn, NY (US); Johnny Hsu, Brooklyn, NY (US)

(73) Assignee: Johnson & Johnson Consumer Inc., Skillman, NJ (US)

( * ) Notice: Subject to any disclaimer, the term of this patent is extended or adjusted under 35 U.S.C. 154(b) by 43 days.

(21) Appl. No.: 17/149,522

(22) Filed: Jan. 14, 2021

(65) Prior Publication Data

US 2021/0142388 A1 May 13, 2021

Related U.S. Application Data

(63) Continuation of application No. 14/336,469, filed on Jul. 21, 2014, now abandoned.

(60) Provisional application No. 61/856,965, filed on Jul. 22, 2013.

(51) Int. Cl.
*G06Q 30/0601* (2023.01)
(52) U.S. Cl.
CPC .............. *G06Q 30/0631* (2013.01)
(58) Field of Classification Search
CPC ................................. G06Q 30/0631
USPC ....................................... 705/26.7
See application file for complete search history.

(56) References Cited

U.S. PATENT DOCUMENTS

| | | | |
|---|---|---|---|
| 5,520,203 A | 5/1996 | Segerstrom | |
| 5,848,976 A | 12/1998 | Weinstein | |
| 6,093,027 A * | 7/2000 | Unger | A61F 13/84 340/5.9 |
| 6,132,416 A | 10/2000 | Broselow | |
| 7,322,474 B2 * | 1/2008 | Berry | B65D 5/4225 116/284 |
| 7,891,474 B2 | 2/2011 | McDaniel | |
| 8,336,917 B2 | 12/2012 | Doiron | |
| 2004/0174011 A1 * | 9/2004 | Weinstein | G09F 3/10 283/67 |
| 2005/0021413 A1 | 1/2005 | Berry | |

(Continued)

OTHER PUBLICATIONS

Gina Angie, "Before & After: Help Remedies", Oct. 26, 2011, thedieline.com (http://www.thedieline.com/blog/2011/10/26/before-after-help-remedies.html?utm_source=feedburner&utm_medium=feed&utm_campaign=Feed:+TheDieline+(TheDieline.com+-+Blog+-+World%27s+%231+Package+Design+Website)) (Year: 2011).*

(Continued)

*Primary Examiner* — Marissa Thein
*Assistant Examiner* — Thomas Joseph Sullivan

(57) ABSTRACT

Product selection packaging for a consumer product that improves the consumer's ability to quickly sort through numerous criteria in a complex decision making process and determine whether that particular consumer product is appropriate for his or her purchase and use is disclosed. The product selection packaging, which is designed for a consumer product includes (a) an interface; and (b) at least one product selection indicia associated with the interface, wherein the selection indicia assist the consumer with determining whether or not the product is appropriate for the consumer's purchase or use.

3 Claims, 5 Drawing Sheets

(56) References Cited

U.S. PATENT DOCUMENTS

| | | | | |
|---|---|---|---|---|
| 2005/0038558 | A1* | 2/2005 | Keene | G06Q 10/109 |
| | | | | 700/235 |
| 2005/0069843 | A1* | 3/2005 | Bagues | G09B 19/02 |
| | | | | 434/208 |
| 2006/0163103 | A1* | 7/2006 | Adler | G09F 3/02 |
| | | | | 206/459.5 |
| 2006/0249950 | A1 | 11/2006 | Kenney | |
| 2007/0095706 | A1 | 5/2007 | Legault | |
| 2011/0004571 | A1 | 1/2011 | Parikh | |
| 2011/0031139 | A1 | 2/2011 | Macor | |
| 2011/0100863 | A1* | 5/2011 | Luciano | A61J 1/03 |
| | | | | 53/473 |
| 2014/0237873 | A1* | 8/2014 | Garay-Marrero | G09F 3/0288 |
| | | | | 40/674 |

OTHER PUBLICATIONS

Amy Hellem; "Review of Cornea & Contact Lenses"; Feb. 2012; Jobson Medical Information LLC (Year: 2012).*

Consumer Health Information; Avoid Maalox Mix-Ups; Feb. 2010; www.fda.gov/consumer (Year: 2010).* consumermedsafety.org, "Not the Same Cold Medicine on the Shelf", Mar. 16, 2013 (https://web.archive.org/web/20130316121050/http://consumermedsafety.org/medication-safety-articles/item/305-not-the-same-cold-medicine-on-the-shelf) (Year: 2013).* walgreens.com; "TheraFlu Warming Relief Severe Cold & Cough Liquid Nighttime Cherry Flavor"; Dec. 16, 2011; walgreens.com (https://web.archive.org/web/20111216182638/http://www.walgreens.com/store/c/theraflu-warming-relief-severe-cold-&-cough-liquid-nighttime/ID=prod2630260-product) (Year: 2011).* creativity-online.com; "Help Remedies: Display, The latest in the line of Help Remedies products and packaging"; Aug. 5, 2009 (http://creativity-online.com/work/help-remedies-display/16675) (Year: 2009).*

Angelika and Mike Schilli; "Two Germans in San Francisco and their view of the world"; Jun. 10, 2007; USArundbrief.com. Note: This publication is originally in German. The version provided is a Google translation to English. Original German version is at https://usarundbrief.com/68 (Year: 2007).*

Schilli, Angelika, et al., "Sudafed PE and Sudafed," Jun. 10, 2007, usarundbrief.com (Year: 2007).*

"Help Remedies: Display," Aug. 5, 2009, Ad Age (Year: 2009).*

"TheraFlu Warming Relief," Dec. 16, 2011, walgreens.com—retrieved via Wayback Machine (Year: 2011).*

Hawkins, Spencer, "Drug Sample Pack Design," Mar. 30, 2011, zillion designs, https://www.zilliondesigns.com/contests/drug-sample-pack-design (Year: 2011).*

"Sunmark Nasal Decongestant", 2003, fda.report (Year: 2003).*

"Childrens Sudafed Nasal Decongestant", 2008, https://dailymed.nlm.nih.gov/ (Year: 2008).*

Butschli, Jim, "Package design helps Help Remedies launch into national distribution," Dec. 6, 2011, packworld.com (Year: 2011).*

Cohen, Michael, "Medication Errors," 2007, American Pharmacists Association, 2nd Edition, selected pages; full text available https://books.google.com/books?hl=en&Ir=&id=Gpj7ZaptUDcC (Year: 2007).*

MSD Consumer Care, Inc., "Picture of Claritin Package", Dec. 30, 2011.

FDA Consumer Health Information (Avoid Maalox Mix-Ups)https://www.fda.gov/downloads/ForConsumers/ConsumerUpdates/UCM200773.pdf) ("FDA").

Kayla Holman, Aging population raises question, bottles or blister packs? Feb. 7, 2012;(https://www.containerandpackaging.com/blog/2012/02/aging-population-raises-the-question-bottles-or-blister-packs/)("Holman").

American Welding Society, Graphic Symbols for Precautionary Labels, Aug. 2012; (https://app.aws.org/technical/facts/fs14-201208.pdf) ("AWS").

Architecture Domain, Questions & Answers: Which languages are written right-to-left (RTL)?, Aug. 8, 2003,(http://www.i18nguy.com/temp/rtl. html)("Architecture").

Gina Angie, "Before & After: Help Remedies", Oct. 26, 2011, thedieline.com (http://www.thedieline.com/blog/2011/10/26/before-after-help-remedies.html?utm_source=feedburner&utm_medium=feed&utm_campaign=Feed:+TheDieline+(TheDieline.com+-Blog+-+word%27s+%231+Package+Design+website))(Year:2011).

Vintage Ad Browser; "Medicine Ads of the 1960s"; May 10, 2013 www.vintageadbrowser.com (https://web.archive.org/web/20130510195622/http://www.vintageadbrowser.com/medicine-ads-1960s) (Year: 2013).

* cited by examiner

FIGURE 1A
FIGURE 1B
FIGURE 1C
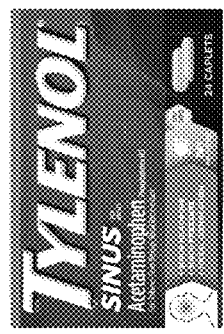
FIGURE 1D
FIGURE 1E
FIGURE 1F
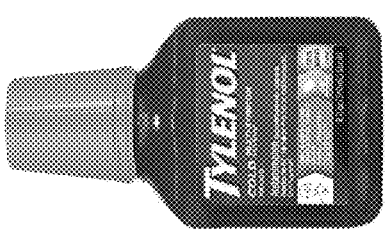
FIGURE 1G
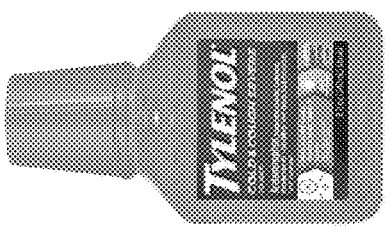
FIGURE 1H
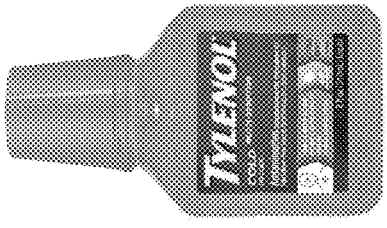
FIGURE 1I
FIGURE 1J
FIGURE 1K

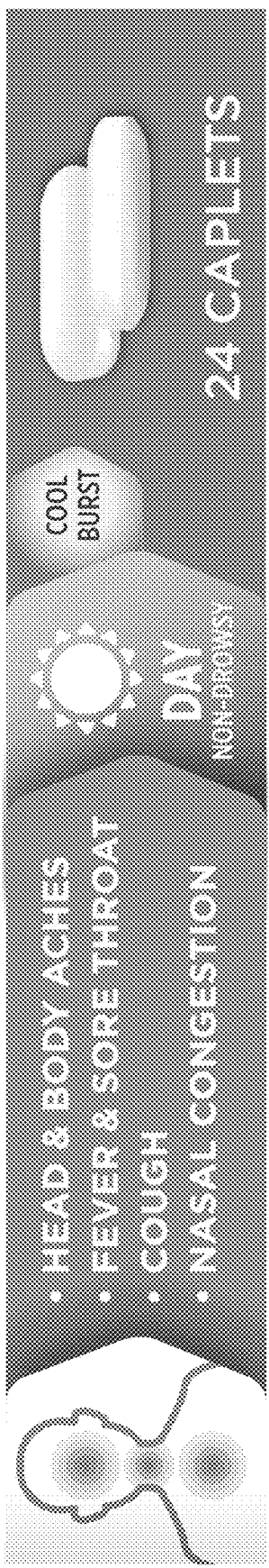
Location of symptoms indicated in color associated with category
/a2
Symptoms treated by product. Matches location diagram
Band in color associated with category
/b2
Usage occasion (day/night or drowsy/non-drowsy)
/c2
/d2
Form and/or flavor
/e2
FIGURE 2A
 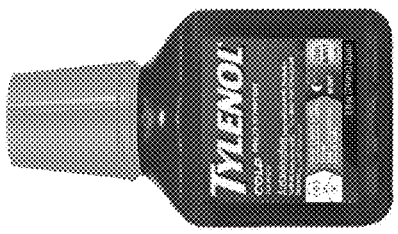
Consistent location for "dashboard" across all products
FIGURE 2B    FIGURE 2C

Cold in name
Blue in dashboard
Blue in top band
(and top panel of carton/
TRP band on bottle)
Blue for head icon and
symptom locators Sinus in name
Green in dashboard
Green in top band
(and top panel of carton/
TRP band on bottle)
Green for head icon and
symptom locators

a3  b3  c3  d3 Sinus
                e3
Symptoms on head

Sinus Severe
Symptoms on head & chest
Yellow "SEVERE" connects to yellow symptoms in the list

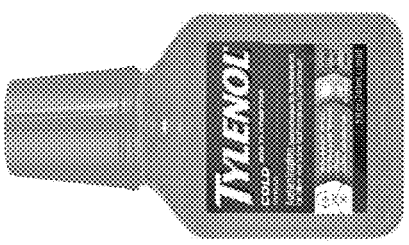
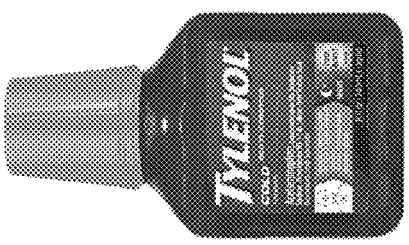

Day
Citrus

Night
Cool

PRODUCT SELECTION PACKAGING AND METHOD OF USE THEREOF

This application is a continuation of U.S. application Ser. No. 14/336,469 filed Jul. 21, 2014, which claims priority of the benefits of the filing of U.S. Provisional Application Ser. No. 61/856,965, filed Jul. 22, 2013, the contents of each of which are hereby incorporated by reference in their entirety.

BACKGROUND OF THE INVENTION

Several consumer products, particularly over-the-counter (OTC) pharmaceuticals, require careful consideration before purchase. Consumption of such products without proper screening has the potential for adverse affects on the consumer or can cause ill will toward the seller if the product is ineffective in treating the consumer's condition.

Despite the recent increase in television and print advertising of pharmaceuticals and conditions treated by them, consumers still lack knowledge about the appropriateness of certain pharmaceuticals for their use. The same is true of other consumer products which require selection at the point of sale.

Various attempts have been made to assist this consumer selection of products. For example, U.S. Pat. No. 6,093,027 to The Procter & Gamble Company describes a system for selection from among hundreds of feminine hygiene products of that which is best suited for a given consumer. In preferred embodiments, the collection of information from a consumer and the selection of a system of feminine hygiene products may be performed using a computer, World Wide Web, an interactive display, a telephone system, published questionnaires, or through literature distributed to health care providers. The packaging identifies, e.g., by package color, which product corresponds to the various systems selected by the customer on the computer, web, etc.

Another consumer selection system is described in U.S. Pat. No. 5,520,203 to Segerstrom. This patent describes a process that generally comprises the steps of determining the prospective user's hair color, skin color, skin type, etc., and making a recommendation regarding cosmetics using a decision tree (see FIG. 2 therein). The recommendation corresponds to a tailored kit containing a complete set of cosmetics for the user's type. The decision tree can be part of an order form in a mail-order catalogue, or an in-store display including a poster or electronic display.

U.S. Pat. No. 5,848,976 to Weinstein discloses a 3-part system combining graphical indicia and medicinal dosages, in which a patient is presented with written questions regarding allergenic substances and conditions (step 1), then provided recommendations regarding allergen avoidance (step 2), followed by provision of allergy medicine in timed dosages (step 3). A permanent record is created when the patient is treated using this system. The disclosure states that, "step 3 provides at least one sequential array of dosage units, which affect a medication regimen that is timed as a function of steps 1 and 2".

U.S. Pat. Nos. 7,322,474 and 7,891,474 to McNeil-PPC, Inc. and Merck & Co., Inc. disclose an interactive product selection system that includes at least one manipulatable product selection device, directive instructions to direct a user to manipulate the product selection device to choose consumer applicable responses from available selectable responses and interpretive instructions that explain how to interpret a pattern of selection indicia associated with the consumer applicable responses.

Other pharmaceutical packaging currently available typically contains printed text thereon describing dosage information, side effects and drug interaction information. More detailed information on these topics is typically included in package inserts. However, the suitability of the packaged pharmaceutical for a particular consumer's needs is typically not readily evident from the packaging without extensive scrutiny.

Consumers are presented with an ever-increasing amount of information regarding consumer products, with many complex factors that need to be considered in order to make a correct purchase decision. Consumers need help in making these complex purchase decisions. For example, in the selection of over-the-counter pharmaceuticals, consumers must consider many factors to determine whether that medicine is right for them. The potential for unwanted side effects from an improperly selected medicine exists, as well as the risk that their condition will not be adequately treated. Also, a flawed selection process can result in a waste of the consumer's money or ill-will toward the seller if the medicine doesn't work.

The present invention addresses this need.

SUMMARY OF THE INVENTION

The present invention involves product selection packaging for a consumer product that improves the consumer's ability to quickly sort through numerous criteria in a complex decision making process and determine whether that particular consumer product is appropriate for his or her purchase and use. The product selection packaging of the invention preferably offers a visible and prominent display that allows potential consumers of the product to determine whether the product is appropriate for the consumer.

The invention informs the consumer whether or not they should purchase the consumer product based on each consumer's current needs. The invention has the distinct advantage of helping a consumer focus on the factors of greatest importance from all the information available concerning a given product, making the information easier to comprehend and use toward making a correct purchase decision. It also permits a very quick and accurate purchase decision without first having to read paragraphs of print copy on, or inside, the package. Most present day consumers are pressed for time and therefore unwilling, or unlikely, to spend the time needed to read extensive copy as a predicate to their purchase decision.

One object of the present invention is to provide product selection packaging for a consumer product comprising: (a) an interface; and (b) at least one product selection symbol associated with the interface, wherein each product selection symbol comprises selection indicia which assists a consumer with determining whether or not the product is appropriate for the consumer's purchase or use.

Another object is to provide a method for assisting a consumer with determining whether or not a consumer product is appropriate for their purchase or use wherein a consumer (a) observes one or more selection indicia that are relevant to appropriate selection or deselection of the product; (b) chooses an applicable response for each decision selection indicia; and (c) determines whether or not the product is appropriate for its purchase or use.

Additional objects will be evident from the following detailed description.

DESCRIPTION OF THE DRAWINGS

The accompanying drawings, which are incorporated in and constitute a part of this specification, illustrate embodiments of the invention, and together with the description, explain the principles of the invention. In the drawings:

FIG. 1A-FIG. 1K are views of the product selection packaging of the invention;

FIG. 2A is a view of a portion of the product selection packaging of the invention illustrating examples of selection indicia used in the product selection packaging. FIG. 2B-FIG. 2C are views of the product selection packaging of the invention;

FIG. 3A-FIG. 3F which contain views similar to FIGS. 1A-1K, highlights selection indicia employed in the product selection packaging of the invention;

DETAILED DESCRIPTION OF THE INVENTION

Figure 4A:
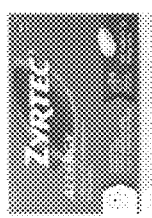
FIG. 4A-FIG. 4H are views showing use of the product selection packaging of the invention on different branded products.
Figure 4B:
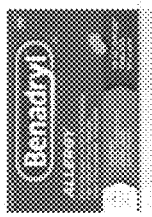
Figure 4C:
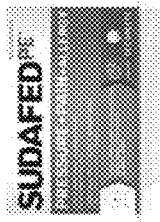
Figure 4D:
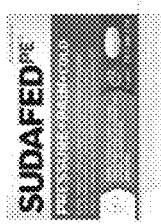
Figure 4E:
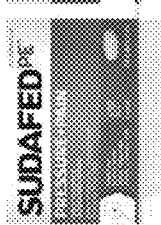
Figure 4F:
Figure 4G:
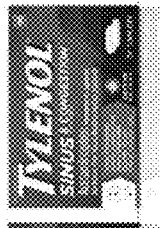
Figure 4H:
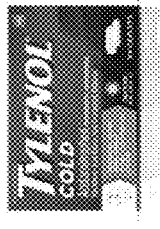

Reference will now be made in detail to the following described embodiments of the invention, examples of which are illustrated in the accompanying drawings. The product selection packaging of the present invention is intended for use with consumer products that are appropriate for use by consumers. The term "consumer" as used herein is intended to mean the person for whom the decision must be made regarding whether or not the product is appropriate for purchase and use.

The term "consumer product," as used herein, is intended to include goods bought for personal use. Several consumer products, particularly OTC pharmaceuticals, require consideration of certain criteria before a decision can be made as to whether or not the product is appropriate for use by an individual consumer. The product selection packaging of the present invention assists the consumer in making the correct decision regarding whether or not to purchase (including, e.g., whether to make an initial purchase or a re-purchase) and use the consumer product based on the consumer's needs.

The term "observable" (and forms thereof such as "observably," "observing," etc.) is intended to have its common meaning, i.e., perceptible (or "perceptibly," perceiving," etc. as appropriate) using any one or more of the five human senses, e.g., sight, sound, touch, taste and smell. The product selection packaging described herein can employ interaction with one or more of the five senses, and particularly may employ visual, audible and tactile interaction or combinations thereof. Preferably, the product selection packaging employs interaction with the visual sense.

The term "interface", as used herein, is intended to be a tangible point of interaction between the product selection packaging and a consumer. More particularly, the interface provides a platform for the consumer to interact with the product selection packaging.

The product selection packaging of the invention provides a mechanism by which consumers are provided with criteria that are relevant to appropriate selection or deselection of a given product. For example, the product selection packaging is presented to the consumer and the consumer simply visually observes decision criteria and selects or deselects a product based on the criteria. Any type of design which functions as product selection packaging as described herein is encompassed by the instant invention.

The "criteria" will have relevance to the decision-making process for deciding whether or not a product is appropriate for, and therefore could be purchased and used by, a consumer considering using the product. Since different criteria for use will apply to different products, the criteria will vary depending on the product being marketed. Examples of criteria include but are not limited to drug, location of symptoms, symptoms treated, time of day for use, drowsy/non-drowsy, form, flavor and combinations thereof.

Criteria as used herein includes both single (i.e., criterion) and multiple (i.e., criteria) characteristics on which a decision may be based. Therefore, criteria associated with product selection packaging may include single or multiple characteristics which are relevant to the decision making process.

Each of the selectable responses will be either positively associated with appropriate purchase and use of the product by a consumer (i.e., a positive selectable response), or negatively associated with appropriate use (i.e., a negative selectable response) and therefore would be associated with deselection of the product.

The term "selection indicia" is intended to mean any observable symbol which is either positively associated with appropriate purchase and use of the product, i.e., positive selection indicia, or negatively associated with appropriate purchase and use of the product, i.e., negative selection indicia. Selection indicia include observable symbols such as graphic symbols including color coding, alphanumeric graphics, pictorial graphics and the like, and sounds such as musical notes, bells, audible language and the like, and combinations thereof. The selection indicia are chosen to be compatible with the design of the interface and product selection packaging. Graphic symbols are preferred.

For the sake of brevity, the term "indicia" as used herein includes both single symbols (i.e., indicium), such as a single color or graphic, and combinations of symbols (i.e., indicia), such as stripes of alternating colors or a specific color background with a pictorial and/or alphanumeric graphic in the foreground, and the like. Therefore, a single selection indicia may be comprised of one symbol or a combination of symbols which, when observed together as a whole, serve as a single positive or negative selection indicia.

Preferably, the product selection packaging is employed at point of sale displays, retail kiosks, and the like.

Combinations of two or more pharmaceutically active agents are also encompassed by the instant invention where each active agent is in a separate dosage unit or combined in a single dosage unit.

Consumers are generally aware from television, print media, or their health care provider that certain health risks can be corrected with OTC medication. Many consumers are therefore interested in OTC medicines to treat these conditions. However, a given OTC product may not be appropriate for a given consumer's needs. This invention facilitates consumer determination as to whether the consumer can benefit from a consumer product, and particularly OTC medicines.

EXAMPLE

The present invention provides a consumer selecting an over-the-counter medicine with all of the information needed to make that selection. FIGS. 1-4, which illustrate the product selection packaging of the invention, demonstrate its use for OTC pharmaceuticals in an easy to use format. The invention, of course, has application to a wide range of OTC pharmaceutical products that require consumer choice regarding whether or not a particular product is personally appropriate for purchase and use.

A consumer who is about to make a purchase decision would approach a store shelf containing the product selection packaging of the invention. As the consumer approaches, his or her attention would immediately be drawn to the product selection portion of packaging. In the illustrated embodiments of the invention, i.e., FIGS. 1-4, this comprises the lower one-third of the front label 1. The lower one-third front label invites the consumer to review the selection criteria (shown in FIG. 1F as a1, b1, c1 and d1) to determine whether the product is right for them.

Figure 5:
FIG. 5 is a view of a typical aisle containing OTC upper respiratory pharmaceutical products in a pharmacy store.

For example, upper respiratory symptoms are difficult for consumers to identify, and due to a proliferation of brands, products and active ingredients, the category or shopping experience is also difficult for them. See, e.g., FIG. 5, which shows a view of a typical aisle containing OTC upper respiratory pharmaceutical products in a pharmacy store. Upper respiratory is also not a category that most people shop for more than once or twice a year. Even then, the consumer may experience different symptoms to treat. The present invention is based in part on the observation that, in qualitative testing, consumers use some package elements to "deselect" products that don't apply to their criteria, and other elements to focus on the right product for them. Most consumers begin their journey by visually identifying the brand through logo, color or iconography recognition, usually gravitating either towards brands they trust or ones that have strong reputations in treating their specific symptoms. Then they read the "name" or variant offered by the brand of their choice, and very quickly move to find the list of symptoms treated to see if it offers the right mix of relief, and cues for what time of day they would take it and trusted form.

The present invention provides a universal solution across a number of upper respiratory brands: Tylenol® Cold, Tylenol® Sinus, Sudafed®, Benadryl® and Zyrtec® (see FIG. 4A-FIG. 4H). The invention may also provide a solution across a single brand (see FIG. 1A-FIG. 1K). The benefits include consistent location, information sequence and visual treatment to ease the consumer's scanning of the package for relevant information (see, e.g., FIG. 2A). The flow of information begins with an icon to visually show the LOCATION of the symptoms treated by the product (see, e.g., a2 in FIG. 2A) (aids in deselection of other products) and reinforces the "name" or variant. This is meant to be processed quickly and directs the consumer to the next step, the list of symptoms formatted consistently with bullets and simple language (matching physical symptoms) (see, e.g., b2 in FIG. 2A). The usage occasion of day or night is the next relevant piece of information in the decision process (see, e.g., c2 in FIG. 2A), followed finally by flavor/form, both of which are highly subjective choices and depicted visually again for speed of locating (see, e.g., d2 in FIG. 2A). The packaging can also include the form of the product for the user's information (see, e.g., e2 in FIG. 2A). Differentiation between products in the brand's portfolio can also be supported by the use of color (see FIG. 3). E.g., the symptoms can be connected to a color that consumers are known to associate with the category (blue=cold for example). Additionally, yellow can be used for the word "severe" to connect to the symptoms treated by the "SEVERE" guaifenesin containing products, so in comparing regular vs severe, the additional benefit is clear.

The invention has been illustrated by detailed description and the examples. Various changes in form and detail will be within the skill of persons skilled in the art. Therefore, the invention must be measured by the claims and not by the description of the examples or the preferred embodiments. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. Product selection packaging for two or more OTC pharmaceutical products to aid a consumer in selecting an OTC pharmaceutical product to treat or alleviate the consumer's symptoms of a disease or condition, comprising:
   (a) a first enclosure for a first OTC pharmaceutical product and a second enclosure for a second OTC pharmaceutical product; and
   (b) at least four product selection indicia integrated with each of the first and second enclosures,
   wherein a first product selection indicia is a pictorial graphic of a portion of a human body to show a location of the symptoms to be treated or alleviated by the respective first or second OTC pharmaceutical product,
   wherein a second product selection indicia is a list of the symptoms to be treated or alleviated by the respective first or second OTC pharmaceutical product,
   wherein a third product selection indicia is an icon depicting a usage occasion of day or night of the respective first or second OTC pharmaceutical product,
   wherein a fourth product selection indicia relates to a form or a flavor of the respective first or second OTC pharmaceutical product,
   wherein at least one of the first, second, third or fourth product selection indicia is different between the first and the second OTC pharmaceutical product, and
   wherein the at least four product selection indicia are positioned longitudinally along a longitudinal 2-dimensional panel on a portion of the first and second enclosures in a location consistent across the first and second enclosures and further wherein the at least four product selection indicia are sequenced longitudinally in the panel such that the product selection indicia begins with the first product selection indicia and flows next to the second product selection indicia and next to the third product selection indicia and next to the fourth product selection indicia from left to right on the longitudinal 2-dimensional panel to ease the consumer's scanning of the package for relevant information.

2. The product selection packaging of claim 1, wherein the first and second enclosures are, independently, a box or carton.

3. The product selection packaging of claim 1, comprising five to six product selection indicia integrated with the first and second enclosures.

* * * * *